United States Patent [19]
Lindsey et al.

[11] Patent Number: 4,744,695
[45] Date of Patent: May 17, 1988

[54] UNDERGROUND CABLE DUCT COMPONENTS AND METHOD OF INSTALLING MULTIPLE CABLES THERETHROUGH

[75] Inventors: Keith E. Lindsey, La Canada; Frank Gasztonyi, Downey, both of Calif.

[73] Assignee: Lindsey Manufacturing Company, Los Angeles, Calif.

[21] Appl. No.: 778,546

[22] Filed: Sep. 20, 1985

[51] Int. Cl.$^4$ ............................. F16L 1/02; H02G 9/00
[52] U.S. Cl. ........................................ 405/154; 174/37; 174/87; 285/176; 285/179
[58] Field of Search ................ 405/154, 157; 285/176, 285/179; 174/37, 38, 39, 87

[56] References Cited

U.S. PATENT DOCUMENTS

| | | | |
|---|---|---|---|
| 1,901,897 | 3/1933 | Clayton | 285/176 |
| 2,056,782 | 10/1936 | Fosdick | 285/179 X |
| 2,506,064 | 5/1950 | Christie | 285/176 |
| 3,390,225 | 6/1968 | Couch et al. | 174/37 |
| 3,552,780 | 1/1971 | Warren | 285/176 |
| 3,792,187 | 2/1974 | Depcrymski | 174/87 X |

Primary Examiner—David H. Corbin
Attorney, Agent, or Firm—Christie, Parker & Hale

[57] ABSTRACT

Disclosed is a kit of curvilinear duct components and a method of utilizing the same to provide an improved mode of simultaneously installing and protecting multiple electrical cables in underground duct installations. The components include tubular elbow members, a major portion of at least some of which are of D-shape in cross section and having a major internal width at least as great as the combined diameters of multiple cables to safeguard against cable jamming during installation and which portion converges at one end to a circular shape matable with adjacent linear ducting. The curvilinear components are formed of impervious, electrically nonconductive, abrasion resistant material, such as polymer, concrete or glass filled thermosetting plastic.

22 Claims, 3 Drawing Sheets

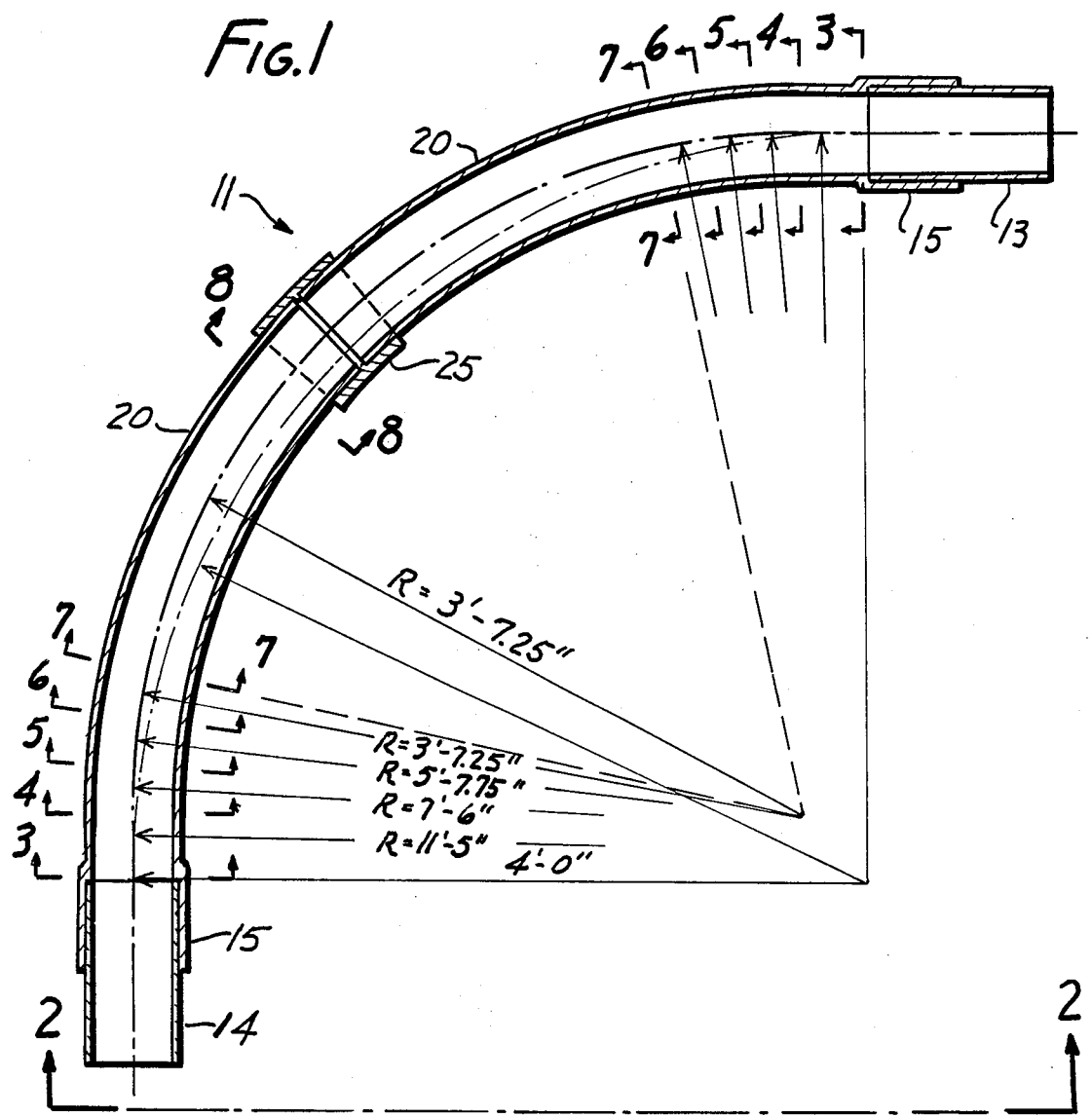
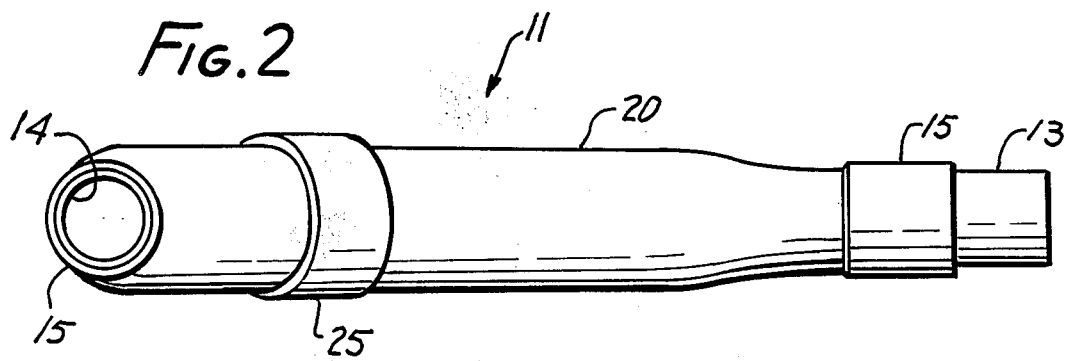

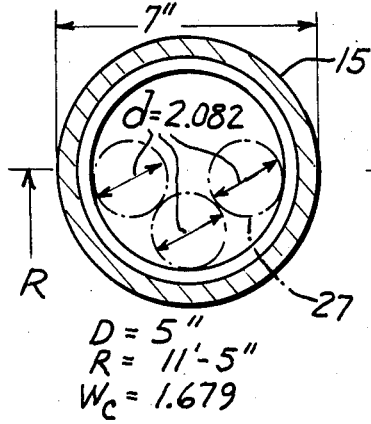
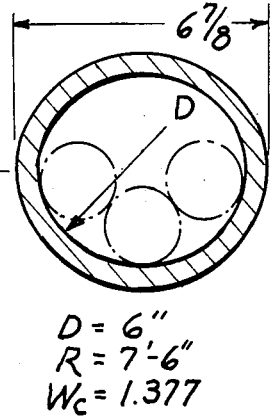
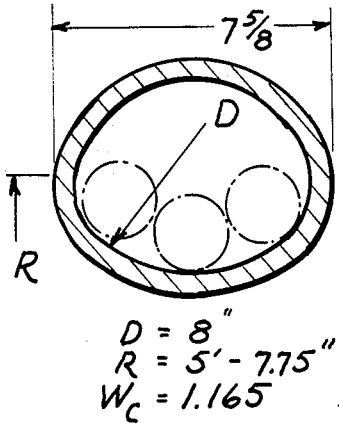
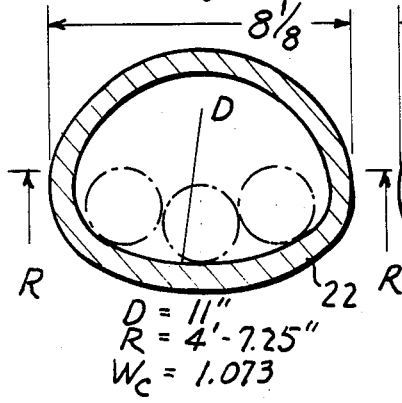
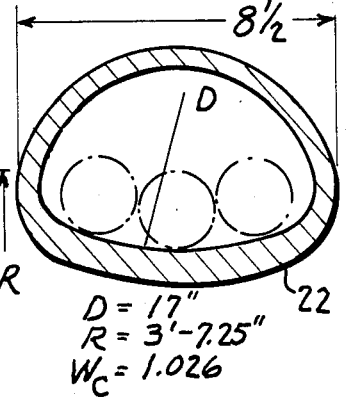
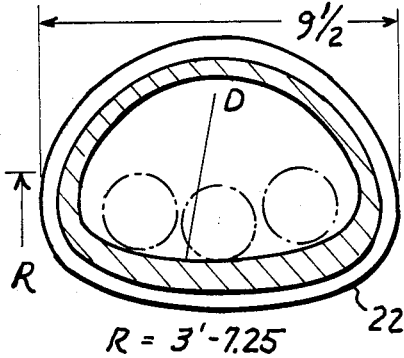
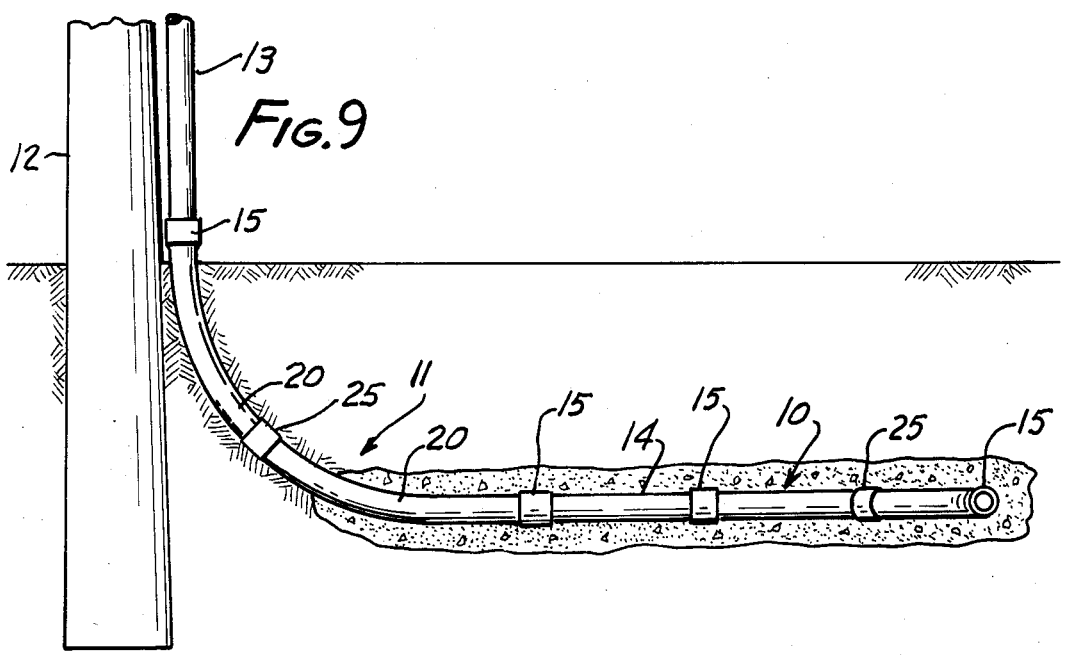

UNDERGROUND CABLE DUCT COMPONENTS AND METHOD OF INSTALLING MULTIPLE CABLES THERETHROUGH

This invention relates to underground ducting, and more particularly to an improved kit of curvilinear duct components and method of utilizing the same to expedite the installation of multiple cables therethrough with greatly reduced pulling effort and minimized risk of injury to either the cabling or the ducting.

BACKGROUND OF THE INVENTION

The simultaneous installation of multiple electrical and communication cabling in underground ducting has long posed serious problems owing to problems encountered in advancing the cabling along curves and elbows such as those commonly utilized at points of ground exit. For example, it is common practice to install three-phase electrical cabling utilizing a heavy duty tow line threaded through the ducting and attached to the leading end of the three cables. Desirably, the ducting is sized for the efficient housing of the three cables. However, such duct size presents serious problems at underground curves or ground exit points at the latter of which it is customary to employ a 90 degree elbow. The high tension forces acting on the hauling line and on the cables as these components bear against curved portions of the ducting develop high temperatures and severe abrasion on both the tow line, the cabling and the ducting.

Burn through of the ducting, damage to the cable insulation, or both, can occur thereby rupturing the walls of these components and permitting moisture and foreign material to enter the ducting and damaging the cable with potential serious consequences.

Efforts to resolve these problems have included the use of expensive, hot dipped galvanized steel at duct bends for these components which are typically made of larger diameter than linear duct elements. This necessitates the provision of adaptor components to interconnect the smaller linear ducting to the larger diameter bend components. Not infrequently the adaptor components cause jamming of the cabling adjacent the entrance into the smaller diameter ducting. This jamming is caused by the pronounced tendency of the multiple cables to "float" at the entrance into the smaller diameter of the bend or the adaptor. That is, the portions of the several cables at bends take positions laterally of one another with the result that their combined diameters in their side-by-side relation exceeds the internal diameter of the ducting. Serious jamming problems caused by these factors are commonly encountered with costly results.

SUMMARY OF THE INVENTION

The foregoing and other serious shortcomings of prior proposals for housing and installing underground cables is obviated by this invention. To these ends there is provided an improved set of components and method of utilizing the same at bends and ground exits for underground cabling. These ends are accomplished by using a minimum amount of electrically nonconductive, impervious, high abrasion resistant material, such as polymer concrete or glass filled thermosetting plastic as the structural material for specially designed and contoured curvilinear duct components. For example, curvilenear portions of the ducting are D-shaped in cross section with the straighter sidewall lying along the inside of the bend and facing axis of curvature. At least one end of this curvilinear portion converges gradually into a circular shape corresponding to the size of the linear ducting. The converging surfaces act to pilot and contract the fanned out cables exiting from a curvilinear portion of the ducting into a compact triangular configuration for efficient confinement within the linear duct. The relatively wide curvilinear section of the bend freely accommodates the multiple cables in their side-by-side relation inherently assumed by the cabling while negotiating a bend. All tendency of the cabling to jam adjacent to the exit into linear ducting is obviated as the converging sidewalls at the exit end act to cam the cabling into a compact geometric relationship.

The foregoing expedients and features of this invention not only result in greatly reduced likelihood of injury to all components but, of particular significance, it is found that the tension forces required to install the cabling is reduced very substantially. The bend sections may be formed as a unit for smaller arcuate applications or in a plurality of components for larger bends such as at 90 degree ground exit installations. The several components are designed for telescopic installation with straight lengths of ducting.

Accordingly, it is a primary object of this invention to provide improved underground cable ducting and a method of utilizing the same to house multiple cables.

Another object of the invention is the provision of an improved kit of components for use in enclosing multiple underground cables and including improved curvilinear components for use at bends and underground cable exits.

FIG. 1 is a longitudinal cross sectional view through a 90 degree tubular elbow assembly embodying features of this invention;

FIG. 2 is a plan view of FIG. 1 as viewed on line 2—2 on FIG. 1.

FIGS. 3-8 are cross sectional views taken along lines 3—3, 4—4, 5—5, 6—6, 7—7, 8—8, respectively, on FIG. 1;

FIG. 9 is an elevational view showing a typical underground installation of the invention ducting including an underground bend and a vertically disposed ground exit elbow closely adjacent, the base of a power-line pole;

Figure 10:
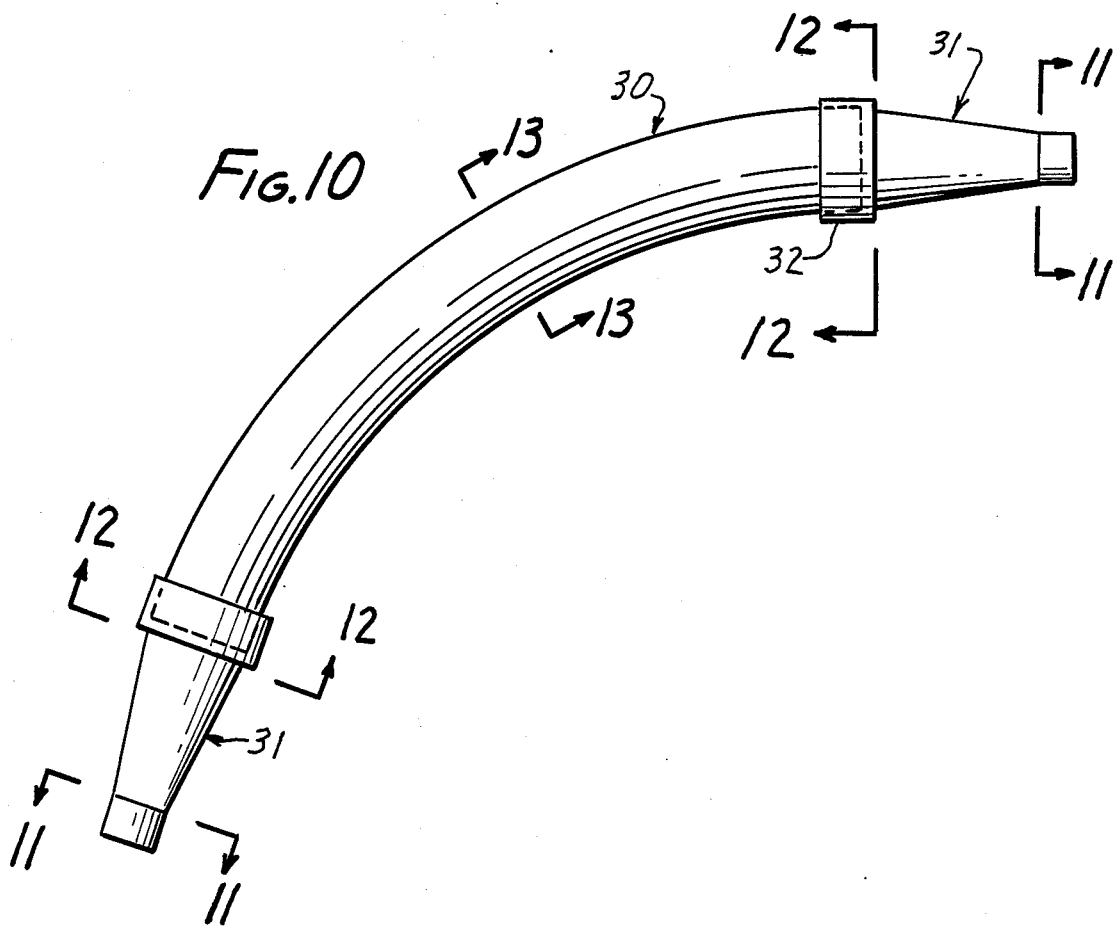
FIG. 10 is a side view of another illustrative embodiment of the invention formed in three parts.

Referring initially more particularly to FIG. 9, there is shown a typical underground duct installation for a three phase electrical power cabling. There shown is a first curvilinear length of ducting 10 lying in a horizontal underground position and a 90 degree elbow assembly 11 exiting from the ground in a vertical plane adjacent the lower end of a power pole 12. A short length of ducting 13 is socketed in the bell at the upper end of elbow 11 and houses cabling connectible to cable terminal facilities not shown, but customarily present at the upper end of pole 12. Although the curvilinear section 10 is shown as a 90 degree elbow, it will be understood that it may be of smaller arcuate extent but it includes the same structural features as elbow 11 to be described in greater detail in connection with FIGS. 1–8. It will be noted in FIG. 9 that the left hand end of elbow 10 is connected to the right hand end of elbow 11 by a short length of linear ducting 14 telescoped into and sealed to bells 15, 15 integral with the opposite ends of elbow units 10 and 11. A typical assembled elbow kit assembly shown in FIGS. 1–8, includes two identical arcuate sections 20, 20 each one of which may have a circular bell 15 integral with one end providing a socket snugly seating a circular length of ducting, such as 13, 14. Each elbow or band may comprise one, two or more portions. A relatively short portion of elbow 20 adjacent bell 15 gradually tapers from a circular configuration shown in FIG. 3 into the D-shaped configuration shown in FIG. 7. The relatively straight inner sidewall 22 faces and is closest to the axis of the curvature of the elbow. Desirably, but not necessarily, this relatively flat sidewall is thicker than the remainder of the elbow sidewall.

As shown in FIG. 1, elbow assembly 11 is formed in two halves, each having a circular bell 15 at one end to seat a straight section of ducting. The other end of each elbow section 20 is D-shaped in cross section and these ends are held in assembled registry with one another by a coupling 25 of the same cross sectional shape and sealed to one another by a suitable cement or sealing compound.

In a typical embodiment of the invention elbow 11 shown in FIGS. 1–8, the components are sized for efficient use with three cables 27 and have an OD of 2.082 inches. Typically, three such cables would be installed in linear ducting having an ID of five inches. The elbow sections would have a minimum wall thickness of approximately one half of an inch and the flattened portion is preferably approximately 50 percent thicker. The elbow sections are manufactured in any suitable manner, such as by casting and the inner flattened wall portion is gradually tapered from the five inch ID diameter adjacent the bell equipped end so as to conform to the representative dimensions set forth in FIGS. 1–8. Thus, it will be noted that the interior diameter of five inches represented by FIG. 3 gradually tapers to the D-shaped configuration with dimensions as shown in FIGS. 4–8, it being noted that the diameter of the flattened wall section 22 gradually changes from a value of five inches in FIG. 3 to a diameter of approximately seventeen inches indicated in FIG. 7 and remains at this value through the remainder of elbow section 20. Likewise, the radius of the portion of the elbow occupied by the three cables varies by the representative figures set forth in FIGS. 1–8.

The several components comprising the kit are preferably made of polymer concrete or a glass filled thermosetting plastic. A suitable polymer concrete is comprised of 15–25 percent polyester monomer with the remainder consisting of silica sand. A suitable plastic material may also be used such as a higher durometer polyvinyl chloride or a plastic known to persons in the plastic art as ABS.

Figure 11:
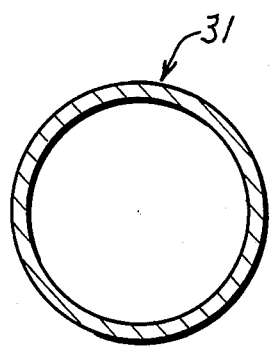
FIG. 11 is a cross sectional view taken along lines 11—11 on FIG. 10.
Figure 12:
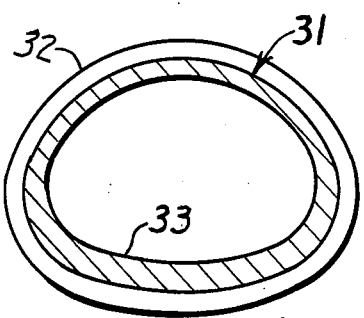
FIG. 12 is a cross sectional view taken along lines 12—12 on FIG. 10.
Figure 13:
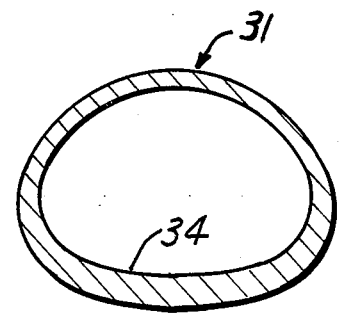
FIG. 13 is a cross sectional view taken along line 13—13 on FIG. 10.

Referring to FIGS. 10 through 13, there is shown a second illustrative embodiment of the invention comprising 3 principal components including a curvilinear section 30 and two identical end sections 31, 31. As shown by way of example the curvilinear section 30 can be extruded from suitable material such as that described for FIGS. 1–9. Owing to its formation by extrusion, section 30 is of uniform cross section throughout. Thus section 30 is D-shaped in cross section with the thicker, flatter sidewall 34 lying along the side of shortest radius and is of uniform cross section throughout its length. At the time of extrusion the material is readily bendable into an arc of desired radius such as that shown in FIGS. 1 and 10. It will be understood that this section may be of any desired angular length.

The similar end sections 31 may be molded or cast of the same material as the curvilinear section. These sections taper convergingly from the larger end from the configuration of section 30 to a circular configuration at the exit end. The taper corresponds in all respects with the taper described in detail in connection with FIGS. 3 through 7 of the first described embodiment, except of course, the larger end of the taper is at the merger of the bell shaped section 32. Each of sections 31 may have a short length of cylindrical cross section at its smaller end shaped to telescope into the bell shaped end of linear ducting.

The installation of multiple conductors or cables, such as three or more, is carried out using conventional equipment and techniques. An initial light duty pilot line is installed through the ducting which normally includes a plurality of generally straight linear sections, one or more curvilinear bend or "sweep38 sections, and a ground exit elbow such as that shown in FIGS. 1 and 9. The pilot line is then employed to install a heavy duty tow line. Thereafter the trailing end of the final tow line is attached to the multiple cables in known manner and used to haul the cables simultaneously into place through the ducting. In linear sections of the ducting, the three cables naturally assume a triangular configuration such as that indicated in FIG. 3. As the cables are advanced into a bend they inherently tend to fan out from a triangular configuration to a side by side configuration as the tension in each cable acts to press that cable against the inner elbow sidewall of shortest radius. The wide sidewall portion of the elbow of this invention permits this inherent tendency of the cables to fan out without interference from one another or from the duct sidewalls.

At the exit end of the bend or elbow, it is important that the cables be returned from their side-by-side relation into a more compact relation for optimum utilization of tubular ducting. However, the cables are under tension and resist return from a small radius configuration into a linear configuration of infinite radius. In other words, the cables tend to "float" or rise out of contact with the duct wall as they enter linear ducting. In consequence, serious jamming of the cables frequently occur with costly results. Jamming is avoided by the present invention owing to the accurately designed bend or elbow as a whole including in particular the tapering portion adjacent the outlet end. This tapering portion is designed to gradually and efficiently cam the cables out of their side by side relation back into a cradled configuration as they approach the end of a bend and pass into generally straight ducting of circular cross section. The converging sidewalls adjacent the exit end of a curvilinear section act as a pilot in camming the cables back into this more compact disposition prior to the entry thereof into the circular outlet end of the bend.

The objective is to reduce the required pulling tension and reduce the sidewall bearing pressure. As the cabling passes through the bend it bears against the shorter radius sidewall with a bearing pressure expressed by the following equation:

$$P = \frac{1}{3}(3Wc - 2)\frac{T}{R} \tag{1}$$

where:
P is the sidewall bearing pressure in pounds
Wc is the weight correction factor in the bend
T is the pulling tension in pounds
R is the radius of the bend.

TABLE A

| D Conduit Dia [in] | d O.D. of Cable [in] | Wc Weight Corr. Factor for Std. Elbow | Wc (eq) Weight Corr. Factor for The New Elbow |
|---|---|---|---|
| 4 | 1.500 | 1.480 | 1.101 |
|   | 1.750 | 1.807 | 1.109 |
| 5 | 1.750 | 1.387 | 1.103 |
|   | 2.082 | 1.679 | 1.110 |
|   | 2.250 | 1.893 | 1.118 |
| 6 | 2.000 | 1.333 | 1.103 |
|   | 2.250 | 1.480 | 1.110 |
|   | 2.500 | 1.680 | 1.118 |

Column three of Table A sets forth weight correction factors, Wc, for typical three cable bundles when installed in respective typical conventional elbow sizes. This weight correction factor is expressed by the following equation:

$$Wc = 1 + \frac{4}{3}\left(\frac{d}{D-d}\right)^2 \tag{2}$$

where
Wc=weight correction factor (dimensionless)
D=inside diameter of duct in contact with the conductors (inches)
d=nominal outside diameter of a single conductor (inches)

The fourth column of this table lists the equivalent weight correction factors, Wc(eq), achieved by the use of the elbow design featuring this invention. Since the design objective of this invention is to provide a tubular bend wherein the pulling tension is minimized, the geometry of this elbow is arrived at by first selecting an inside diameter of duct in contact with the conductors, D, which gives a suitably low value of weight correction factor, Wc, from equation 2 in the major portion of the elbow, that is, section 20, shown in FIG. 1. Next the pulling tension, T, is obtained from the following equation:

$$T = \frac{3PR}{(3Wc - 2)} \tag{3}$$

wherein
P=sidewall bearing pressure which is a function of the cable being pulled
R=radius of elbow bend, determined from geometry and application requirements of the sweep or riser elbow.

The transition section, shown as sections 3—3, 4—4, 5—5, 6—6 and 7—7 in FIG. 1, is next designed. As the inside diameter of the duct in contact with the conductors, D(a), is changed, a new weight correction factor, Wc(a), is calculated at each section (3—3, 4—4, 5—5, 6—6 and 7—7 in FIG. 1, from the following equation:

$$Wc(a) = 1 + \frac{4}{3}\left(\frac{d}{D(a) - d}\right)^2 \tag{4}$$

wherein:
Wc(a) represents a weight correction factor at a selected angular position (a)
a=a selected angular position along the bend
D(a)=effective inside diameter of the duct in contact with the conductors at a selected angular position (a)
d=diameter of the individual cables.

At each of these cross sections, a new elbow radius is calculated from the following equation:

$$R(a) = \frac{1}{3}(3Wc(a) - 2)\frac{T}{P} \tag{5}$$

wherein:
R(a) is a radius of the elbow at a selected angular position "a"
T is held constant from the previous calculation in equation 3.

The equivalent weight correction factor, Wc(eq), for the entire length of the new bend or elbow is calculated by using equation 6 to compute the value of the pulling tension out, $T_{out}$, by summing the tension along the full length of the elbow by successively using the following equation=

$$T_{out} = T_{in}\, e^{fbWc(a)} \tag{6}$$

wherein
$T_{out}$=pulling tension out of an arc of b radians
$T_{in}$=pulling tension into an arc of b radians
e=base of Naperian logarithm system
f=coefficient of friction between the cables and elbow material (typically between 0.2 and 0.4)
b=an angle of arc in radians where Wc(a) is approximately a constant
Wc(a)=weight correction factor at selected successive angular positions (a) along the bend or elbow.

Then for any assumed $T_{in}$ one obtains a $T_{out}$ expressed by equation 6. Then the equivalent weight correction factor, Wc(eq) is calculated by using the following equation:

$$Wc(eq) = \frac{Ln\,(T_{out}/T_{in})}{cf} \tag{7}$$

wherein
Ln=natural logarithm
c=the total angle of the elbow or bend in radians.
$T_{in}$=pulling tension entering into the entire elbow
$T_{out}$=pulling tension exiting entire elbow obtaining by solving equation 6 for the entire elbow For example, if the total value of the tension in $T_{in}$ for both the conventional elbow and the present invention is 1,000 pounds, the coefficient of friction f is 0.3 and the angle of change of the elbow is a 90 degrees or 1.571 radians, then the required tension to pull three cables with a 2.082 diameter through the elbow can be calculated and compared. Such calculations will show that the weight correction factor Wc from Table A for the conventional elbow will be 1.679 and the required pulling tension $T_{out}$ will be 2,206 pounds. This value contrasts with an equivalent weight correction factor of 1.11 and a pulling tension $T$ out of 1687 pounds for the elbow embodying the features of this invention.

While the particular underground cable duct components and method of installing multiple cables therethrough herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. An article of manufacture comprising:

a tubular elbow component of nonconductive high-strength material which is sized and shaped to minimize damage to and the tensile force required to tow a plurality of electrical cables simultaneously into ducting formed of at least one of said elbow components;

said elbow component including a relatively long first portion of D-shape in cross section one end of which converges gradually into a junction with a relatively short second portion of circular cross-section; and the wider interior dimension of said first portion being at least as great as the combined diameters of the plurality of cables to be installed therein and located on the side thereof nearest the center of curvature of said elbow component.

2. An article of manufacture as defined in claim 1 characterized in that the terminal end of said second portion of circular cross section includes a bell sized to telescopically seat the end of a duct of circular cross section.

3. An article of manufacture as defined in claim 1 characterized in the provision of a pair of said tubular elbow components, and tubular sleeve means of D-shape in cross section and sized to telescopically seat and interconnect the end of the first portion of a respective one of a pair of said elbow components.

4. An article of manufacture as defined in claim 1 characterized in that the diameter of said relatively short second portion of said elbow component is greater than the diameter of two cables, but substantially less than the diameter of three similar cables adapted to be installed therewithin.

5. An article of manufacture as defined in claim 1 characterized in that said wider interior dimension of the outer end of said relatively long first portion of said elbow component of D-shape is greater than the combined diameters of the plurality of cables to be installed in said elbow component.

6. An article of manufacture as defined in claim 1 characterized in that the interior of said first and second portions are so constructed that the radius of said bend R(a) is directly proportional to the weight correction factor Wc(a) as this factor varies along said first and second portions in accordance with the following equation:

$$R(a) = \frac{1}{3}(Wc(a) - 2)\frac{T}{P}$$

wherein Wc(a) is the weight correction factor, R(a) is the radius of the flatter wall of the bend, T is the pulling tension, and P is the sidewall bearing pressure.

7. A tubular elbow kit for use in housing sub-surface portions of three or more electrical cables and to minimize problems associated with simultaneously towing such cables therealong, comprising:

a pair of tubular elbow components each having a relatively long first arcuate portion of D-shape in cross section gradually tapering at one end into a merger with a relatively short second portion of circular cross section equipped at the outer end thereof with a bell for telescopic assembly to one end of a length of straight ducting and having the straighter side of said D-shaped first portion facing toward and nearest the axis of curvature of said elbow components; and a coupling sleeve of D-shape in cross section adapted for snug telescopic assembly to the D-shaped end of a respective one of said pair of elbow components.

8. A tubular elbow kit as defined in claim 7 characterized in that said pair of elbow components are cast in one piece from high-strength, non-porous, non-conductive, abrasion-resistant material.

9. A tubular elbow kit as defined in claim 7 characterized in that said straighter sidewall of said first portion of said pair of elbow components is substantially thicker than the remainder of said first portion.

10. A tubular elbow kit for use in housing subsurface portions of two or more electrical cables and to minimize problems associated with simultaneously towing such cables therealong comprising:

a first tubular elbow component of generally uniform D-shape cross section from end-to-end thereof with the straighter side thereof facing toward the axis of curvature; and a pair of similar tubular end components each having a bell-shaped end sized and shaped for telescopic assembly to a respective end of said first elbow component and an internal passage which converges from a larger end of D-shape sized to merge and register smoothly with the interior of said first elbow component to a smaller end of circular shape.

11. A tubular elbow kit as defined in claim 10 characterized in that said first elbow component is extruded in one piece from polymer concrete and bent into an arcuate configuration before said polymer concrete takes a set.

12. A tubular elbow kit as defined in claim 10 characterized in that said pair of tubular end components are formed from polymer concrete.

13. A tubular elbow kit as defined in claim 10 characterized in that said pair of tubular components are formed from glass filed thermosetting material.

14. A tubular elbow kit as defined in claim 10 characterized in that said first elbow component is formed of glass filled thermosetting material.

15. That method of substantially expediting the simultaneous installation of two or more electrical cables along ducting having curvilinear portions coupled between linear portions with substantially minimized towing force and risk of injury to all components and without risk of jamming as the cables pass along said curvilinear outlet portions of the ducting and into generally linear ducting, said method comprising:

providing a length of ducting the major portion of which is D-shaped in cross section with the opposite end thereof tapering gradually into circular end portions sized to mate with similarly sized linear ducting of circular cross section and with the straighter sidewall of said curvilinear portion facing toward the axis of curvature of said curvilinear portion and having a major internal diameter selected to minimize pulling tension and wherein the major internal width of said D-shaped section is at least as great as the combined diameters of the cables to be simultaneously installed therealong.

16. That method defined in claim 15 characterized in the step of forming said curvilinear ducting of impervious, electrically non-conductive, abrasion-resistant material.

17. That method defined in claim 15 characterized in the steps of forming said curvilinear ducting into two halves having one end of each of similar D-shape in cross section, and providing a tubular coupling sized to snugly interconnect said similar D-shaped ends in registry with one another.

18. That method defined in claim 15 characterized in the steps of so designing said portion of D-shaped cross section as to create a weight correction factor approaching unity as expressed by the equation:

$$Wc = 1 + \frac{4}{3}\left(\frac{d}{D-d}\right)^2$$

wherein:
  Wc = weight correction factor in the D-shaped cross section
  D = major internal diameter on the D-section
  d = nominal outside diameter of a single conductor.

19. That method defined in claim 15 characterized in the steps of so designing said tapering end portions and said D-shaped portion that the radius of said curvilinear portions of said ducting, R(a), is directly proportional to the weight correction factor, Wc(a), as this factor varies along said curvilinear portions of said ducting in accordance with the following equation.

$$R(a) = \frac{1}{3}(3Wc(a) - 2)\frac{T}{P}$$

wherein
  R(a) = radius of the flatter wall of the bend
  Wc(a) = weight correction factor
  T = pulling tension
  P = sidewall bearing pressure.

20. That method of expediting the simultaneous installation of multiple electrical cables along curves in ducting with minimized risk of damage to all involved components and with minimal tensile force applied to the cables which comprises:
  providing a tubular elbow of high-strength non-conductive material including a relatively long first portion of D-shape in cross section one end of which converges gradually into a junction with a relatively short second portion of circular cross section; and
  wherein the wider interior dimension of said first portion is at least as great as the combined diameters of said multiple electrical cables being installed therein and located on the side thereof nearest the center of curvature of said tubular elbow.

21. That method defined in claim 20 characterized in the step of providing the terminal end of said second portion of circular cross section with a bell sized to telscopically seat the end of a duct of circular cross section.

22. That method defined in claim 20 characterized in the steps of providing a pair of said tubular elbows; and providing a tubular coupling sleeve of D-shape in cross section shaped and sized to telescopically seat and interconnect the end of said first portion of a respective one of said pair of elbows.

* * * * *